(12) United States Patent
Brommer et al.

(10) Patent No.: US 8,115,630 B2
(45) Date of Patent: *Feb. 14, 2012

(54) COHERENT MULTICHIP RFID TAG AND METHOD AND APPARATUS FOR CREATING SUCH COHERENCE

(75) Inventors: Karl D. Brommer, Exeter, NH (US); Kenneth R. Erikson, Henniker, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 191 days.

This patent is subject to a terminal disclaimer.

(21) Appl. No.: 11/918,850

(22) PCT Filed: Aug. 24, 2006

(86) PCT No.: PCT/US2006/033112
§ 371 (c)(1),
(2), (4) Date: Nov. 20, 2008

(87) PCT Pub. No.: WO2007/025061
PCT Pub. Date: Mar. 1, 2007

(65) Prior Publication Data
US 2009/0303014 A1      Dec. 10, 2009

Related U.S. Application Data

(60) Provisional application No. 60/711,314, filed on Aug. 25, 2005.

(51) Int. Cl.
*G08B 13/14* (2006.01)

(52) U.S. Cl. ............... 340/572.1; 340/572.4; 340/10.1; 340/10.4; 340/10.41; 340/40.42

(58) Field of Classification Search .... 340/572.1–572.9, 340/10.1–10.6
See application file for complete search history.

(56) References Cited

U.S. PATENT DOCUMENTS

| | | | |
|---|---|---|---|
| 5,686,902 A | 11/1997 | Reis et al. | |
| 5,689,431 A * | 11/1997 | Rudow et al. | 701/213 |
| 5,764,138 A * | 6/1998 | Lowe | 340/447 |
| 6,002,344 A | 12/1999 | Bandy et al. | |
| 6,249,227 B1 | 6/2001 | Brady et al. | |
| 6,538,563 B1 | 3/2003 | Heng | |
| 6,816,063 B2 | 11/2004 | Kubler et al. | |
| 6,990,204 B2 * | 1/2006 | Nishikawa | 380/262 |
| 7,102,522 B2 * | 9/2006 | Kuhns | 340/572.7 |
| 7,501,932 B2 * | 3/2009 | Pillai et al. | 340/10.1 |
| 2001/0034600 A1 * | 10/2001 | Yasunaga et al. | 704/219 |
| 2002/0183012 A1 * | 12/2002 | Horst et al. | 455/70 |
| 2004/0166921 A1 * | 8/2004 | Michaelson | 463/20 |
| 2005/0104790 A1 * | 5/2005 | Duron | 343/745 |
| 2006/0097848 A1 * | 5/2006 | Davidson et al. | 340/10.2 |

* cited by examiner

*Primary Examiner* — Daniel Wu
*Assistant Examiner* — Ryan Sherwin
(74) *Attorney, Agent, or Firm* — Daniel J. Long; Robert K. Tendler

(57) ABSTRACT

An RFID tag (10), containing at least two independent microscopic RFID chips (16) or microradios is programmed with the same unique identifier for each chip. The unique identifier is used in the RFID chips (16) to key the RFID chip (16) transmitting to produce outputs in the same time slot so that the outputs add coherently, thus to create an output that is identical to that of a conventional tag containing only one such chip.

14 Claims, 3 Drawing Sheets

COHERENT MULTICHIP RFID TAG AND METHOD AND APPARATUS FOR CREATING SUCH COHERENCE

RELATED APPLICATIONS

This application claims rights under 35 USC §119(e) from U.S. Application Ser. No. 60/711,314 filed Aug. 25, 2005 by Kenneth R. Erikson and Karl D. Brommer, the contents of which are incorporated herein by reference.

FIELD OF THE INVENTION

This invention relates to the use of Radio Frequency Identification (RFID) tags for tracking items during shipping, receiving the items at final destination and inventory control of items, and more particularly to RFID tags composed of at least two integrated circuits and a method and apparatus for causing the circuits in such a tag to work together cooperatively or coherently.

BACKGROUND OF THE INVENTION

As described in Provisional Patent Applications 60/711,217, 60/711,218, and 60/711,325 incorporated herein by reference, the use of multiple microradios or RFID chips connected to an antenna can in their aggregate provide enough signal strength to be received by a RFID reader.

The integrated circuits that constitute microradios involved in the invention are microscopic in size and are purposely made small to realize cost savings by manufacturing millions of such chips on a single silicon wafer.

The above patent applications describe various ways in which microradios can be coupled to the feed point of an RFID tag antenna. In one embodiment they are embedded in large numbers in a conductive slurry. This is the case where the microradios attach to a single feed point. In the case where the microradios electromagnetically couple to the antenna, the slurry should be non-conductive, preferably with a dielectric constant, a high magnetic permeability or possibly both. When these microradios are deposited in the vicinity of the feed point of the antenna, they couple to the antenna so that the tag can be both interrogated by an RF reader and their response detected.

As described in these patent applications, some of the microradios will be in a proper orientation and polarity to receive interrogating signals and to transmit the requisite information out through the antenna to which they are coupled. Many of the microradios will not be in the appropriate orientation or polarity and are not activated in the programming process.

Assuming there are appropriately activated and programmed microradios or RFID chips coupled to the antenna feed, there is a requirement that when interrogated, all of these microradios transmit at the same time and with the same data so that they work together cooperatively or coherently. It is desired that these microradios when properly coupled and activated will act in unison so that the signals from the tags will add cooperatively and not destructively. If they add destructively the information transmitted will be garbled. If they add cooperatively, the transmission will not be garbled. Also, with cooperative adding there is a quadratic power level enhancement such that the minuscule outputs of the microradios add to provide a more robust tag output signal. Note that a tag made in this fashion will be indistinguishable from a convention single chip tag.

If these RFID chips implement the so-called slotted ALOHA protocol or other similar communications protocols, then these chips would by design transmit at different times and be in different time slots.

The purpose of these protocols is to address the problem of so-called "collisions" between RFID tags that transmit at the same time. This was accomplished by utilizing a pseudo-random number generator to control the time at which a tag would transmit. Upon an interrogation signal, the pseudo-random generators generate different numbers to set different time slots for transmission so that the tags would have a staggered output that would be readable by the reader.

In normal operation, the reader sends out a burst of RF energy and any tag that can receive this energy uses this RF energy to charge up some kind of energy storage like a capacitor that is inside the tag. The electronics in the tags then begin to work and the reader then sends out a query command that says, "OK, is there anybody out there and if you're out there, please respond to me."

In the simplest case, only one tag is queried and responds to indicate its presence. The reader then acknowledges the existence of the tag and requests the tag information. In one embodiment, the tag then sends back the information, in a simple 96-bit code that would be a unique identifier for the item or product that it is on. The reader then acknowledges receipt of the information and causes the tag to turn off.

As will be appreciated, this standard protocol was devised for the case where one has tags having outputs that collide with each other. In one scenario there might be 50 tags or 100 tags all charged up and ready to go. The reader sends out a query command and, for instance, two of those tags respond in the same time slot. The reader recognizes the collision and asks the tags to try again. Those tags that collided go through a process to pick out a different time slot to respond in and afterwards do not collide with each other.

This change of time slot is done by a pseudo-random number generator. The pseudo-random number generator takes a stored seed number and uses a software program or firmware to generate another number. Each of the tags that have collided has a different seed in them to cause the pseudo-random number generator to output a different time slot number.

After the two colliding tags have picked out new time slots to respond in, the reader comes back and queries the tags again. Then the tag responds at its designated time slot in a normal way, with the other tag then responding in a different time slot. Thus the signals from the two tags are disambiguated.

If one has 50 tags or 100 tags, there is a higher probability of collision and maybe even some probability of multiple collisions. To solve the multiple collisions problem, the above process is invoked sequentially until all 50 or 100 tags are read out.

While the slotted ALOHA protocol is useful in reading out different tags on different items, in item level tagging addressed by the micro miniature radios described herein, if these microradios or RFID chips use the slotted ALOHA protocol and transmit at different times, not only could there be destructive interference, there could be no cumulative $n^2$ signal strength increase due to coherent transmission.

SUMMARY OF THE INVENTION

With multiple microradio chips in a single tag, the tag must respond just like any other single chip tag. All of the chips within the tag must therefore respond in an identical manner to the reader and cooperate with each other. The word, "cooperate" is another word for the fact that the microradio chip outputs have to be coherent with each other. They have to send out the same kind of data, and they have to pick the same time slot using the pseudo-random number generator. To the outside world, the outside world cannot and should not ever know that there are multiple chips on this single tag. Since these chips are designated to meet standard protocols, coherence is achieved as follows:

First, the tags are programmed at the time they are placed on an item. During that programming phase, all of the microradio RFID chips on an individual tag are programmed with the same seed for their pseudo-random number generators. Because the pseudo-random number generator always gives the same time delays, all chips will transmit their information to the tag antenna in the same time slot.

When the tag is charged up by the reader, the tag electronics turn on. As a result, each chip in the tag is active. The reader then sends out a query and each chip then individually responds and sends a signal out through the common antenna, with all chips sending out the same kind of signal. These are on/off digital signals in which the ones and zeroes come out at the same time from each of these chips.

The way to ensure that all chips send out signals in the same time slot is that each of the chips is provided with the same seed for the pseudo-random number generator during programming. Because of the use of the identical pseudo-random number generators in the chips, when provided an identical seed, each of the transmitters in the chips will transmit in the same time slot.

What happens in the case where one has numbers of these tags is that each of the tags is programmed with a different seed for its chips, so that collisions will not occur. If they do occur, the signals from the reader instruct different tags to install different seeds in different tags. This means that the original seed used to create coherence is changed for each of the microradios in its tag. The subject system works just like the standard case, with the result being that each tag is programmed to transmit in a different time slot.

Thus initially, in the subject invention each tag is programmed with a different seed during attachment to an item. This seed is changed if later on there are collisions. Note that the seeds for a tag can be programmed at the time of applying the RFID label to a package. Thus before the product ever leaves the manufacturer to move to the merchandiser, it is programmed both with an ID and a seed.

Since all of the above microradios have non-volatile memory, during programming one can write in the 96-bit product code and the seed. As a result, it is in the programming phase where the differences among the tags are generated.

In short, within a tag having multiple microradios, all have the same seed and work coherently. For different tags, however, they are initially programmed with different seeds so that they will transmit in different time slots.

More specifically, if each of the microradios at the feed point of an antenna is programmed to transmit simultaneously by using the same pseudo-random number generator with the same seed, then the microradios will act in unison or coherently. This will also have the beneficial effect of increasing the signal strength of the signal applied to the antenna.

As described in the aforementioned patent applications, each of the individual microradios or RFID chips is selectively activated and is also provided with a non-volatile memory into which an ID code is programmed from a programming station.

Thus, utilizing the standard slotted ALOHA protocol described in detail in the ISO/IEC 18000 or epcGlobal™ standards as well as in the RFID handbook, one can construct microradios or RFID chips that can be made to operate in a coherent fashion in response to an interrogating signal.

In summary, it is the purpose of the subject invention to make all of the microradios at the feed point of an RFID tag antenna transmit at the same time with precisely the same information so as to avoid destructive interference and achieve the signal level increase associated with multiple microradios transmitting at the same time through the same antenna.

BRIEF DESCRIPTION OF THE DRAWINGS

These and other features of the subject invention will be better understood in connection with the Detailed Description, in conjunction with the Drawings, of which.

DETAILED DESCRIPTION

By way of further background, RFID tags are becoming a well-established method for tracking materials during shipping and storage. In many applications they replace the printed bar code labels on items because they do not require a close proximity for the automatic reader. RFID tags that conform to the ISO/IEC 18000 or epcGlobal standards also can contain significantly more data than a printed bar code label and can be modified en route to include waypoint or other information.

Present RFID tags are usually fabricated by electrically bonding a custom integrated circuit (IC) to a substrate containing a printed circuit antenna. The usual fabrication method, well known in the electronics industry is flip-chip bonding. An electrically conductive solder paste is applied to the appropriate places on the antenna. A "pick and place" machine picks up the IC die and places it onto the substrate in the proper location with respect to the antenna connections. The assembly is then heated to cure the solder and mechanically bond the structure. The substrate may have an adhesive backing for eventual manual or machine application to the end item.

The above mentioned provisional patent applications teach methods for fabrication of a low cost RFID tag utilizing microscopic microradios or RFID chips wherein at least two integrated circuits are deposited onto a tag.

Figure 1:
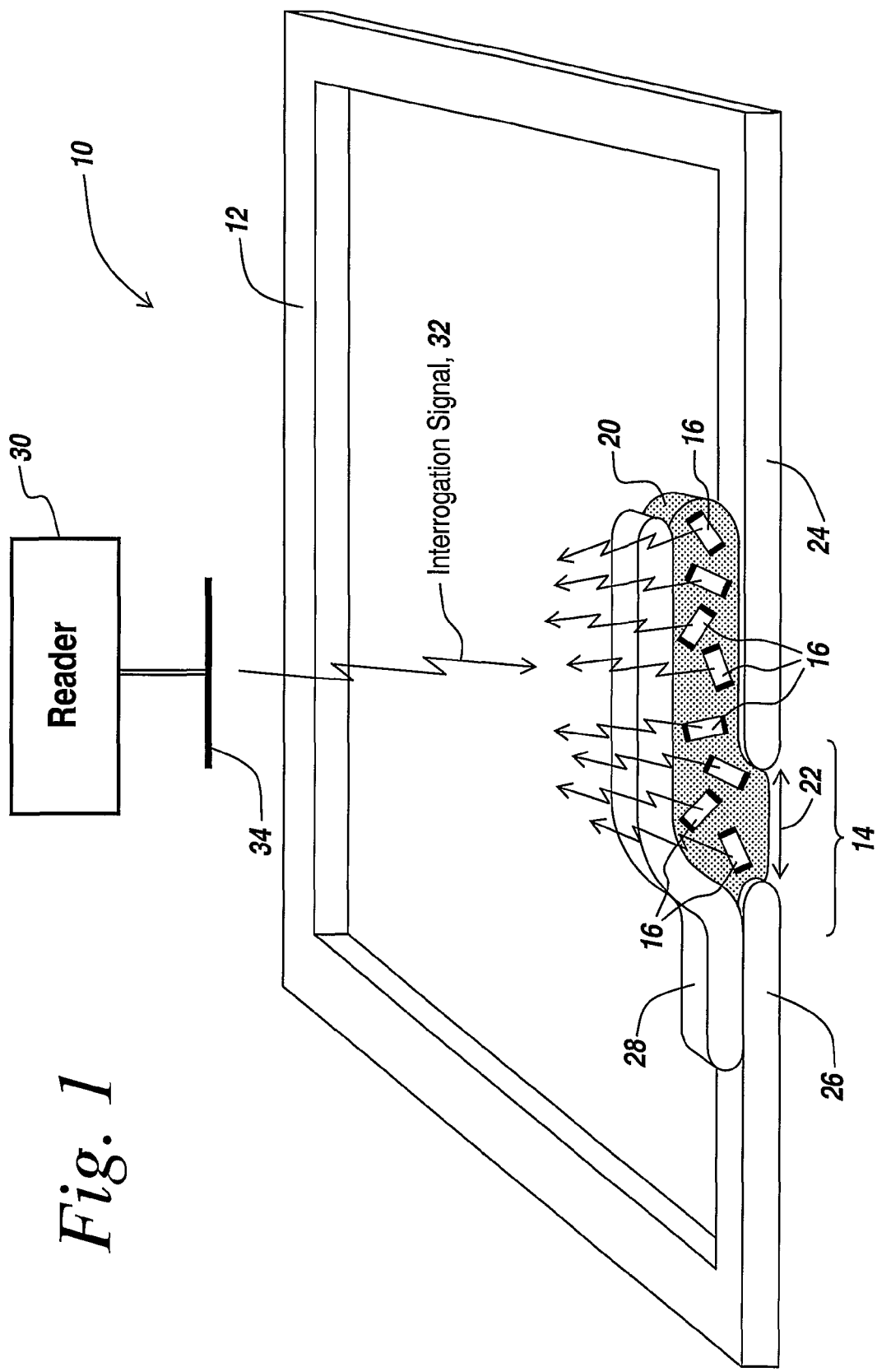
FIG. 1 is a diagrammatic illustration of an RFID tag having an antenna with multiple microradio RFID chips at its feed point, also showing a reader interrogating the tags with an interrogation signal and with the tags responding back to the reader.

In FIG. 1, in one embodiment of the subject invention, tag 10 is provided with a dipole antenna 12, which has a feed point 14 at which microradios or RFID chips 16 are located. Chips 16, in one embodiment, are carried in a non-conductive dielectric slurry 20 that is printed over a gap 22 between antenna feed portions 24 and 26, with a conductive stripe 28 printed over slurry 20.

Microradios 16 are coupled to antenna 12 by virtue of coupling to the feed point. The manner of coupling of these microradios is discussed in Provisional Patent Application Nos. 60/711,217; 60/711,325; and 60/711,218. Whether there is direct DC coupling or electromagnetic field coupling between the individual microradios and the antenna feed, it is desired that all of the microradios radiate coherently, meaning that they provide exactly the same digital message in exactly the same time slot.

Reader 30 provides an interrogation or query signal 32, that is utilized first to power up all of the microradios at the antenna feed and then to instigate a simultaneous readout of all of the microradios. Such a miniature tag is inexpensive due to the utilization of inexpensive RFID chips that, because of their ultra-small size, provide a tag that costs less than 5 cents.

The microscopic size of the microradios results in the outputs of the microradios being lower than that associated with normal integrated circuits used in RFID tags. It is for this reason that it is an advantage that all of these microscopic microradios operate in a coherent fashion to generate a robust tag signal.

Figure 2:
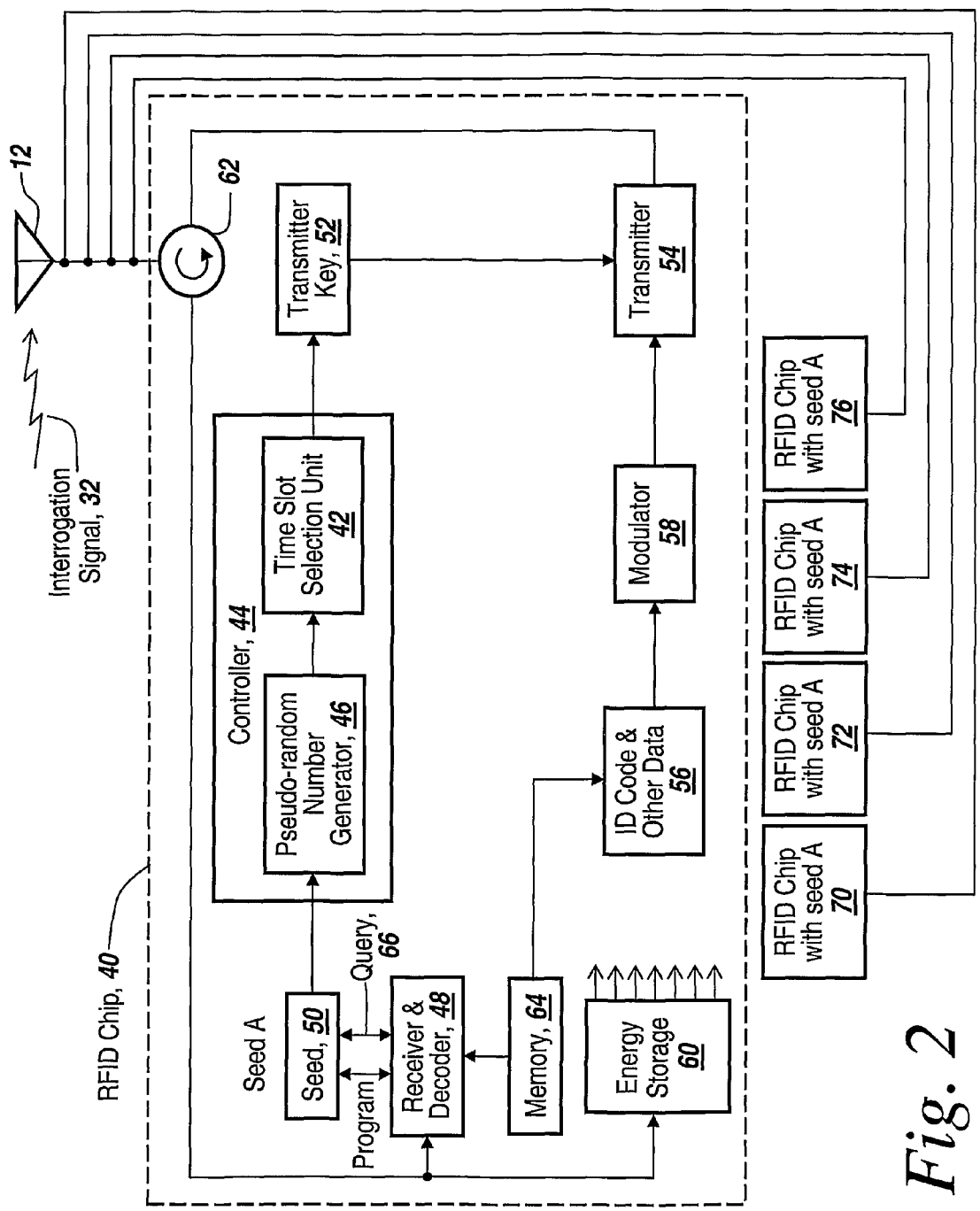
FIG. 2 is a block diagram of an RFID tag for use in the system of FIG. 1, in which multiple RFID chips are deposited at the feed point of the antenna to operate in a cooperative and coherent fashion to transmit identical signals through a common antenna, in which the time slots for the transmission of the signals for all of the RFID chips are programmed to be identical through the utilization of a pseudo-random number generator and a common seed for each of the RFID chips in the tag; and, FIG. 3 is a diagrammatic representation of the reading out of multiple tags, each tag having multiple microradios, with each tag programmed with different seeds, thus to provide the tags with different time slots for the transmission of the information from the respective tags to the reader.

Referring to FIG. 2, one way of providing coherence for each of the microradios in FIG. 1 is to assure that they transmit in the same time slot.

Here an RFID chip 40 includes a time slot selector 42 which is inside controller 44 that includes a pseudo-random number generator 46. This type of controller, be it a software or a firmware controller, is structured in accordance with the standardized anti-collision time slot protocols, with the pseudo-random number generator originally designed to output different numbers to establish random time slots.

However, in the subject invention this same architecture is utilized to ensure that each of the RFID chips 16 in FIG. 1 all transmit identical information in the same time slot.

It will be appreciated that an RFID chip includes a receiver and decoder 48, which receives signals from a programming device and installs seed 50 into a non-volatile memory on the chip, in this case SEED A.

The time slot selection unit 42 activates transmitter key 52, which in turn keys transmitter 54 on to output the programmed ID code and other data stored in non-volatile storage 56, with transmitter 54 modulated by modulator 58 to transmit the digital information stored in unit 56.

In operation and as discussed before, the signal from the reader is first a tone burst of RF energy that is rectified and stored in energy storage 60 that powers all of the integrated circuit components needing power.

Thereafter, this probe tone from the reader continues and can be used by synchronization unit 61 to synchronize and phase lock the output of transmitter 54 to the tone. Since all other microradios are synchronized to this tone they will be synchronized to each other.

More specifically, in terms of phase coherency, it is important that not only should there be no conflict between the pulse envelopes indicative of the digital data, it is also important that the transmitters for each of the RFID chips operate coherently with respect to the other transmitters of the other chips. This permits the aforementioned quadratic power level increase as well as maintaining better control over the generation of the pulse envelopes corresponding to the ones in zeroes of the data to be transmitted from the microradio through the antenna to the reader.

The synchronization occurs by tapping off the normal 900 megahertz signal from the reader after energy storage 60 has produced enough energy to power the transmitter. The transmitter 54 is locked into synchronism with the waveform from the reader that arrives at antenna 12 and is supplied to synchronization unit 61 to control transmitter 54 utilizing phase lock loop technology.

Optionally, each microradio may adaptively tune itself to generate maximum output by for instance sensing the VSWR on the transmitter path.

Thereafter, upon transmission of an additional query signal decoded by receiver 48, seed 50 is installed in pseudo-random number generator 46, with this seed setting the time slot for the transmission of the indicated information from transmitter 54 out through antenna 12.

In one embodiment a unit such as a circulator 62 isolates the receiver section of the RFID chip from its transmitter section.

As discussed in the aforementioned patent applications, the RFID chip 40 is first programmed with the particular identification number of the item to which it is to be attached, plus a unique seed number. This programming is established by receipt of programming signals by antenna 12, which are received by receiver 48 and decoded so as to set seed 50, in this case to a value SEED A.

After the programming step, a query from the reader is detected by receiver and decoder 48 in accordance with information stored in memory 64. This in turn produces a signal on line 66 to install seed 50 in the pseudo-random number generator to ensure the keying of transmitter 54 in the same time slot.

As can be seen in this illustration, identical RFID chips 70, 72, 74 and 76 are each provided with identical seeds, namely SEED A, so that upon receipt of an interrogation signal at antenna 12, each of the RFID chips acts in exactly the same manner to transmit exactly the same information at the same time in the same time slot. In this manner, the microscopic microradios or RFID chips have their outputs added coherently so that what is transmitted from antenna 12 is the same signal and the various chips cooperate rather than competing with one another. Without this coherence, scrambled signals that could not be understood by the reader could result.

What has thus been described is the operation of a single tag having multiple microradios, which in the aggregate provide a robust tag output signal for item-level tagging at an extremely low cost per tag.

Figure 3:
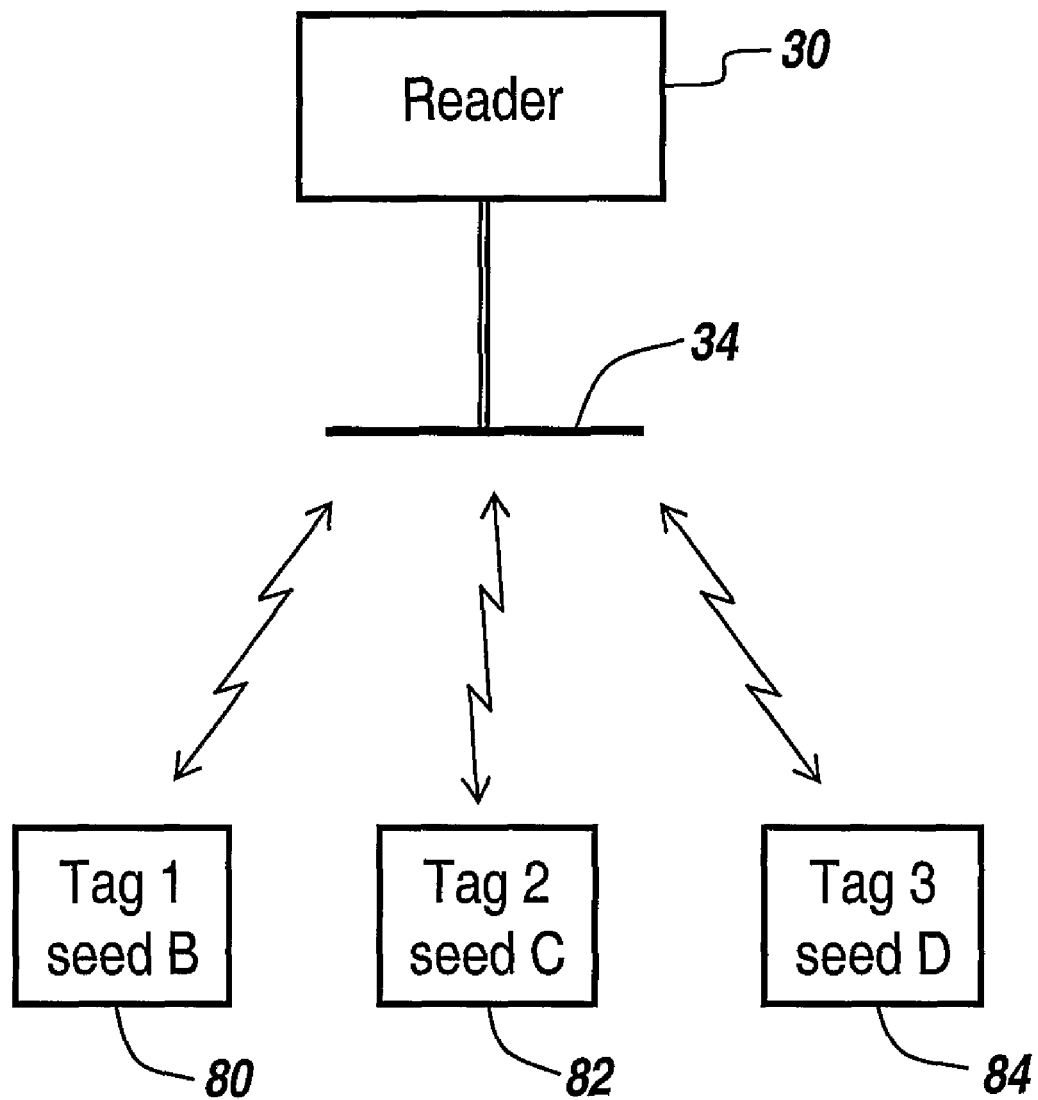

The problem of collisions described above for multiple tags is illustrated in FIG. 3, in which reader 30 interrogates Tag 1, here illustrated at 80 with SEED B; Tag 2, here illustrated at 82 with SEED C; and Tag 3, here illustrated at 84 with SEED D.

It will be appreciated that if Tag 1, Tag 2 and Tag 3 were to communicate with reader 30 in the same time slot, then collisions and confusion of the reader will occur.

Since different seeds are pre-programmed in each tag at the manufacturing level, then upon querying by the reader with an interrogation signal, collisions can be managed according to standardized protocols.

In one of the standardized formats described above, the manufacturer is given 8 bits in addition to the 96-bit ID code. If these 8 bits are used to program a seed, 256 seeds and thus 256 timeslots are available.

However, if collisions are detected at the reader then each of the tags is instructed to transmit in a different time slot. In one embodiment this can be done by having each tag generate a new time slot using a different pre-stored seed for each microradio as an input to its pseudorandom number generator to generate a different time slot. In a manner well-known from the slotted ALOHA protocol, each colliding tag will in this manner generate a new random time slot that is statistically unlikely to be the same as any other tag's time slot.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In an RFID tag employing more than two microradio chips connected to the feed point of the tag antenna, a method for assuring that the digital outputs of the microradio chips do not interfere with each other, comprising the steps of:
   providing more than two microradio chips in a single tag;
   activating all of the microradio chips in a single tag such that they produce coherent outputs in the same time slot, the activation step providing that the outputs of the microradio chips in the single tag occur in the same time slot, the activation step including determining the time slot for which a microradio chip generates an output by providing each microradio chip with a pseudo-random number generator and a time slot selection unit coupled thereto, with the time slot selection unit keying the associated microradio chip transmitter in the single tag in a time slot set by the output of the pseudo-random number generator; and,
   providing each of the pseudo-random number generators for the microradio chips in a single tag with an identical seed to assure coherence.

2. The method of claim 1, wherein the outputs of the microradio chips include bits of information, and wherein the step of providing an identical seed to assure coherence includes providing phase coherence of the outputs of all of the microradio chips such that not only is each bit of information in the output of each microradio chip transmitted at the same time, the RF output of all of the microradio chips is phase coherent such that the outputs of the microradio chips add constructively to increase the output of the antenna.

3. The method of claim 1, and further including the step of transmitting an RF signal to all of the microradio chips through the tag antenna such that the transmitters of all of the microradio chips are synchronized in phase to the RF signal, whereby not only will the digital bits be transmitted by all of the microradio chips at the same time, but also the signals from all of the microradio chips will be phase coherent and in phase.

4. The method of claim 1, and further including the step of irradiating the tag with RF energy from a reader of sufficient strength to charge up each of the microradio chips to turn on the electronics contained in each chip.

5. The method of claim 4, and further including the step of having the reader transmit out a query to each of the microradio chips.

6. The method of claim 5, wherein upon receipt of a query from the reader each of the microradio chips individually responds and sends out a signal through the tag antenna, all of the microradio chips sending out the same kind of signal.

7. The method of claim 6, wherein all of the signals transmitted by the microradio chips are digital signals involving 1's and 0's that come out in the same time slot at the same time from each of the microradio chips.

8. The method of claim 1, and further including the step of programming the tag at the point of shipment of an item bearing the tag such that each of the associated microradio chips in the tag is programmed with a unique identification number.

9. The method of claim 8, wherein the programming step includes instructing different tags to install different seeds such that the microradio chips of different tags, while transmitting in a single time slot, are programmed such that different tags have different seeds and thus different time slots associated therewith, whereby the tags may be programmed with different seeds during attachment to different items.

10. The method of claim 9, and further including the step of reading out the tag utilizing a reader and further including the step of instructing the microradio chips in a tag to transmit in a different time slot upon detection of collisions with other tags.

11. The method of claim 10, wherein the step of instructing the tags to transmit in different time slots based on the detection of a collision includes having each tag generate a new time slot using a different pre-stored seed.

12. The method of claim 11, wherein the instruction to use a different pre-stored seed is in response to the detection of a collision by the reader.

13. An RFID tag, comprising:
   a common antenna;
   more than two microradio chips in a single RFID tag coupled to said common antenna, each of said microradio chips including a pseudo-random number generator coupled to a time slot selection unit for selecting the time slot in which said microradio chips transmit, each microradio chip including a transmitter that transmits under control of said time slot selection unit;
   an identical seed for each of said pseudo-random number generators;
   a receiver and decoder for detecting the interrogation signals that arrive at said antenna;
   a seed generator coupled to said receiver and decoder for outputting said identical seed responsive to an interrogation signal;
   a data storage medium for storing at least an identification code related to a tagged item;
   a modulator coupled to said identification code for modulating said transmitter with said identification code;
   energy storage coupled to said antenna for converting RF energy at said antenna to energy to power said RFID chips; and,
   for each microradio chip a synchronization unit coupled to said antenna for establishing phase coherence between RF energy arriving at said antenna and the output of a microradio chip transmitter, such that the output of said transmitter is phase coherent with the RF signal at said antenna, thus to establish phase coherence between all of the microradio chips associated with said tag and coupled to said common antenna.

14. The apparatus of claim 13, wherein said seed generator includes a unit for pre-storing different seeds and wherein said receiver and decoder, upon receipt of a collision-indicating signal from said reader, instructs said seed generator to generate a second seed different from a first seed to establish a time slot different from that associated with the first seed.

* * * * *